(12) United States Patent
Bergt et al.

(10) Patent No.: US 11,798,267 B2
(45) Date of Patent: Oct. 24, 2023

(54) METHOD FOR GENERATING LABELING DATA THAT DESCRIBE AN IMAGE CONTENT OF IMAGES DEPICTING AT LEAST ONE SCENE, CORRESPONDING PROCESSING DEVICE, VEHICLE AND DATA STORAGE MEDIUM

(71) Applicant: ARGO AI GMBH, Munich (DE)

(72) Inventors: Sebastian Bergt, Munich (DE); Miria Von Rotberg, Munich (DE)

(73) Assignee: Ford Global Technologies, LLC, Dearborn, MI (US)

( * ) Notice: Subject to any disclaimer, the term of this patent is extended or adjusted under 35 U.S.C. 154(b) by 327 days.

(21) Appl. No.: 17/205,396

(22) Filed: Mar. 18, 2021

(65) Prior Publication Data

US 2021/0295068 A1    Sep. 23, 2021

(30) Foreign Application Priority Data

Mar. 19, 2020   (EP) .................................... 20164223

(51) Int. Cl.
  *G06N 3/08*       (2023.01)
  *G06V 10/778*     (2022.01)
  (Continued)

(52) U.S. Cl.
  CPC ......... *G06V 10/7784* (2022.01); *B60W 40/08* (2013.01); *B60W 50/14* (2013.01);
  (Continued)

(58) Field of Classification Search
  CPC ........... G06V 10/7784; G06V 10/7788; G06V 10/82; G06V 20/56; G06V 20/584; B60W 40/08; B60W 50/14; B60W 60/001; B60W 2050/146; B60W 2420/42; B60W 2540/225; G02B 27/0101; G02B 2027/014; G06F 3/013; G06F 3/017; G06F 3/0482; G06F 3/167; G06F 18/21; G06N 3/08;
  (Continued)

(56) References Cited

U.S. PATENT DOCUMENTS

| | | | |
|---|---|---|---|
| 7,961,080 B2 | 6/2011 | Grigsby et al. | |
| 11,210,851 B1 * | 12/2021 | Nussbaum | ............ H04W 4/021 |
| 2018/0012082 A1 | 1/2018 | Satazoda et al. | |

OTHER PUBLICATIONS

Extended European Search Report dated Aug. 20, 2020 in corresponding European Patent Application No. 20 164 223.8.

(Continued)

*Primary Examiner* — Charlotte M Baker
(74) *Attorney, Agent, or Firm* — Frank MacKenzie; Brooks Kushman P.C.

(57) ABSTRACT

A method for generating labeling data is disclosed that describes an image content of images depicting at least one scene, wherein in a processing device image data are received from an imaging and a segmentation unit that detects at least one object in the image data. A graphical processing unit generates a respective graphical object marker that marks the at least one detected object and a display control unit displays an overlay of the at least one scene and the at least one object marker. An input reception unit receives a respective user input for each object marker, wherein the respective user input provides the image content of the image region marked by the object marker.

12 Claims, 3 Drawing Sheets

(51) Int. Cl.
| | |
|---|---|
| G06T 7/11 | (2017.01) |
| G06T 7/70 | (2017.01) |
| B60W 60/00 | (2020.01) |
| B60W 40/08 | (2012.01) |
| B60W 50/14 | (2020.01) |
| G02B 27/01 | (2006.01) |
| G06F 3/01 | (2006.01) |
| G06F 3/0482 | (2013.01) |
| G06F 3/16 | (2006.01) |
| G06T 11/00 | (2006.01) |
| G10L 15/22 | (2006.01) |
| G06V 20/58 | (2022.01) |
| G06F 18/21 | (2023.01) |
| G06V 10/82 | (2022.01) |
| G06V 20/56 | (2022.01) |

(52) U.S. Cl.
CPC ....... *B60W 60/001* (2020.02); *G02B 27/0101* (2013.01); *G06F 3/013* (2013.01); *G06F 3/017* (2013.01); *G06F 3/0482* (2013.01); *G06F 3/167* (2013.01); *G06F 18/21* (2023.01); *G06N 3/08* (2013.01); *G06T 7/11* (2017.01); *G06T 7/70* (2017.01); *G06T 11/00* (2013.01); *G06V 10/7788* (2022.01); *G06V 10/82* (2022.01); *G06V 20/56* (2022.01); *G06V 20/584* (2022.01); *G10L 15/22* (2013.01); *B60W 2050/146* (2013.01); *B60W 2420/42* (2013.01); *B60W 2540/225* (2020.02); *G02B 2027/014* (2013.01); *G06T 2207/20081* (2013.01); *G06T 2207/20084* (2013.01); *G06T 2207/30252* (2013.01); *G10L 2015/223* (2013.01)

(58) Field of Classification Search
CPC ... G06T 7/11; G06T 7/70; G06T 11/00; G06T 2207/20081; G06T 2207/20084; G06T 2207/30252; G10L 15/22; G10L 2015/223
USPC .......................................................... 382/104
See application file for complete search history.

(56) References Cited

OTHER PUBLICATIONS

Mackowiak, Radek et al., "CEREALS—Cost-Effective Region-based Active Learning for Semantic Segmentation," Oct. 23, 2018, XP055721816, https://arxiv.org/pdf/1810.09726.pdf.

\* cited by examiner

METHOD FOR GENERATING LABELING DATA THAT DESCRIBE AN IMAGE CONTENT OF IMAGES DEPICTING AT LEAST ONE SCENE, CORRESPONDING PROCESSING DEVICE, VEHICLE AND DATA STORAGE MEDIUM

The invention is concerned with a method for generating labelling data that describe an image content of images which depict at least one scene, for example a traffic scene. The invention also provides a processing device for performing the method. Finally, the invention is also concerned with an autonomously driving vehicle that may comprise the processing device.

An autonomously driving vehicle may rely on an artificial neural network for performing an object recognition for recognizing objects in the surroundings of the vehicle on the basis of image data that may be provided by an imaging unit, e.g., a camera sensor and/or a radar sensor and/or a lidar sensor. For enabling an artificial neural network to perform an object recognition of this kind, the artificial neural network has to be trained. This training process involves that the artificial neural network is presented with typical input data, i.e., image data that show possible scenes with objects that have to be recognized. In the training process, additional data are provided that indicate the ground truth, i.e., they provide a description of those objects that are actually visible in the image data. These ground truth data are termed labelling data, as they provide a label for indicating what is represented in the image data. By providing both the image data and the corresponding labelling data, the training process is able to train the neural network in two steps that may be performed for each image. First the partially trained neural network generates recognition data which are compared with the labelling data to derive the difference as the recognition error. In the second step, the difference or recognition error is used to adapt weighting factors inside the artificial neural network in order to reduce the recognition error. A typical algorithm used for this type of training process is called "deep learning". The training process is also known as "machine learning".

For a training process, a large amount of image data is needed. The image data may be generated on the basis of test drives through different scenes, e.g., different traffic situations. It may be necessary to provide hundreds of hours of video material as image data. Additionally, the labelling data are needed for all the image data. The labeling data are generally generated manually by operators who watch the image data in a laboratory and decide what the recognition result should be, i.e., which content should be set in the labeling data (for example: if an image shows a motorcycle, the labelling data are set to "motorcycle" for that image). This process of manually generating labelling data is time-consuming.

Document U.S. Pat. No. 7,961,080 B2 discloses a system and method for implementing automotive image capture and retrieval. After a camera has captured an image, the image is stored within an image database, along with associated metadata. The associated metadata may include GPS position coordinates, the time the image was captured and the speed of the vehicle at the time of image capture. Also, voice annotations or other user annotations may be entered at the time of image capture to convey other personalized data associated by the user with the image.

It is an object of the present invention to provide labelling data for labeling image data of images depicting at least one scene.

The object is accomplished by the subject matter of the independent claims. Advantageous developments with convenient and non-trivial further embodiments of the invention are specified in the following description, the dependent claims, and the figures.

The invention provides a method for generating labelling data that describe a semantic content, i.e., an image content of images depicting at least one scene. A "semantic content" or image content is the information which object can be seen in the scene depicted by the image. In other words, an image consisting of image data (for example a JPG-image file or a MPEG-video file) only provides information about the single pixels (their color and/or intensity). In contrast to this, the labelling data may provide the additional semantic information what the image is showing, e.g., a vehicle. For example, the labeling data may contain the string "vehicle". The scene depicted in the images can be, for example, a traffic scene showing traffic participants and/or traffic infrastructure.

The method may be performed by a processing device. By the processing device image data describing the images are received from an imaging unit. Such an imaging unit may be based on at least one camera and/or radar and/or lidar and/or ultrasonic sensor for providing 2D or 3D images. The processing device may be coupled to the imaging unit. The image data may describe at least one image for which labelling data are needed. In the processing device, a segmentation unit detects at least one object in the at least one scene on the basis of the image data and generates corresponding segmentation data describing a respective image region that depicts the respective detected object in the respective image. For example, the segmentation unit may detect bounding boxes that each frame one detected object. In other words, the segmentation unit distinguishes between different regions in the image wherein each region is defined by the image data showing one object that is detected in the image. The segmentation unit does not need to recognize the object with regard to the object type, i.e., no semantic interpretation is necessary. In other words, the segmentation unit may segment or delimit an object of a specific object type, e.g., a vehicle, in an image without recognizing that the segmented region is showing that object-type, e.g., a vehicle. For segmenting the at least one object in the image, a segmentation criterion can be used, for example based on an edge detection and/or a homogeneously colored region (as defined by a homogeneity criterion). Such Segmentation algorithms are available in the prior art. The underlying rationale for using a segmentation unit is that the segmentation does not require the recognition of an object.

Once the at least one region (each depicting a respective detected object) is described by the segmentation data, a graphical processing unit of the processing device generates marker data that describe a respective graphical object marker which marks the respective image region of the at least one detected object. The marker data are generated on the basis of the segmentation data. Each marker may mark or indicate one specific region that depicts one detected object. A marker can be, for example, a bounding box (four lines forming a rectangle) and/or a partially transparent and colored mask that may be overlaid over the detected object in the image. Thus, by displaying the image and the marker, the corresponding detected object is highlighted or marked in the image by the marker.

Correspondingly, a display control unit displays an overlay of the at least one scene (that is shown in the image data) and the at least one object marker. This overlay is generated on the basis of the marker data. The marker data may describe the form and/or the position of the marker in the overlay. Accordingly, each object marker is respectively positioned over the respective object that it marks. The processing device uses its display control unit for controlling at least one display for generating the overlay of the at least one scene and the at least one object marker. The overlay is displayed by controlling at least one display unit. In this overlay, a user can then see the scene with the at least one object and additionally the respective marker marking one detected object each.

An input reception unit receives a respective user input for each object marker. In other words, for each marker, the user may provide a user input. The respective user input provides a description of the image content of the image region marked by the object marker. Thus, by providing the user input, the user defines what an image content, i.e., which object (for example the object type) has actually been marked by the respective marker. If the scene shows a vehicle and a marker (for example a bounding box) highlights this vehicle, the user may provide as a user input the information "vehicle".

A label generation unit of the processing device generates the labelling data wherein by the labelling data the respective image region depicting a respective object is associated with the description as provided by the user input. In other words, the label generation unit combines the image region showing the object and the user input describing the image content (i.e., the object shown in that region of the image). This results in labelling data indicating that in the scene in a specific region of a respective image an object can be seen that is described by the user input.

Thus, a user may generate the labelling data by watching the overlay (scene with overlaid markers) and for each marker the user may directly provide the user input describing the object that can be seen inside the region that is highlighted by the marker. The invention makes use of the fact that a segmentation unit may delimit such regions that contain a visible object without the need of recognizing that object. A segmentation criterion may be purely based on graphical properties and may be agnostic of object-types. The user then only has to regard or view the specific region and has to provide a description of the object that can be seen inside the region. This speeds up the process of generating labelling data considerably.

The invention also comprises embodiments that provide features which afford additional technical advantages.

In one embodiment, at least one display unit that is controlled by the display control unit of the processing device is a head-up unit wherein the head-up unit displays the at least one marker object on a transparent combiner screen. Such a combiner screen can be, for example, a windscreen of a vehicle. In other words, in the described overlay (combination of the scene and the at least one marker), the scene is not an image, but the user may watch the real scene through the transparent combiner screen. In the overlay the at least one marker is displayed on the combiner screen such that it appears in the field of view of the user while the user is regarding the real scene through the transparent combiner screen. This provides the advantage that the user has a direct view onto the scene itself. In one embodiment, one display unit that is controlled by the display control unit is a screen or display screen that displays both the image data of the scene and the marker data. Thus, both the scene and the marker are a pixel-based graphical output on a display screen. This provides the advantage that the optical contrast of the at least one marker in relation to the scene can be set to a predefined minimum contrast by setting brightness values of the pixels. In one embodiment one display unit controlled by the display control unit is a set of augmented reality glasses (AR-augmented reality). Thus, the marker data describing the at least one marker are displayed on a wearable device that the user may wear on the head while regarding the real scene through the glasses. This provides the advantage that the user may turn the head and may see at least one marker in any direction where the user turns the head.

In one embodiment the input reception unit that receives the user input as the description of the detected object receives this user input as a voice command and performs a speech recognition for recognizing the verbal description of the image content. In other words, the user may speak out the description, e.g., object type or name of the object (e.g., "vehicle"), and by means of the speech recognition the labelling data may be generated. This provides the advantage that the user may continue regarding the scene while providing the user input. Additionally, or alternatively, in one embodiment the input reception unit receives the user input as a typed input. This provides a large flexibility in defining the labelling data. Additionally, or alternatively in one embodiment the input reception unit displays a list of possible object descriptors and receives a user selection of one of the object descriptors as the user input. This limits the choice of possible user inputs to the list of object descriptors. One object description is chosen by the user as the labelling data. This provides the advantage that a unique object descriptor is defined for a specific object type, for example a "vehicle" is always labelled as a "vehicle" and not, for example, in some cases as a "car" and in other cases "vehicle".

In one embodiment the input reception unit receives a gesture signal from a gesture recognition device. Such a gesture recognition device is known from the prior art and may recognize a manual gesture that the user may perform in the air. The detection of the gesture may be contact-free (e.g., via camera) or contact based (e.g., via touch screen). Additionally, or alternatively the input reception unit receives a gaze direction signal from a gaze recognition device. Such a gaze recognition device is known from the prior art and may detect and signal a direction vector pointing into the direction where the user is looking at. Based on the gesture signal and/or the gaze direction signal the input reception unit determines a marker selection that indicates which object marker the user input refers to. If the overlay shows the scene with several different markers, the user may thus select one of the markers and provide the corresponding user input for defining the labelling data for this marker. This provides the advantage, that several markers may be displayed at once which make the generation of labeling data more effective.

However, in one embodiment in the case of several detected objects the corresponding object markers are displayed sequentially, nevertheless. In other words, one marker is displayed after the other and in between displaying two successive markers, user input is received for the currently displayed marker. This provides the advantage that the user's attention is always drawn to only one specific marker at a time.

In one embodiment at least one additional user input is received that provides segmentation data of a missed object that was missed by the segmentation unit. In other words, the user may provide additional segmentation data that describe an image region where the user has seen another object that was not segmented by the segmentation unit. This provides the advantage that additional labelling data for an object may be defined. The segmentation data may be provided by the user, for example, on a touch screen where the user may mark the object with a finger or a stylus.

In one embodiment the at least one object is detected during a test drive of a vehicle that is driving through the at least one scene. The object marker is displayed in the vehicle and a user providing the input is situated in the vehicle during the test drive. This provides the advantage that the labelling data may be generated at the same time with the image data during the test drive. This is a very efficient way of generating training data, i.e., a combination of image data and labelling data, for training an artificial neural network.

In one embodiment, the vehicle is an autonomously driving vehicle, i.e., a vehicle that may be controlled by an autopilot device. In this embodiment the path the vehicle plans to take is also displayed to the user. Additionally, or alternatively abstracted map data containing environment information, e.g., lane information, is displayed to the user. This provides a support for the user to prepare for providing user input for the next segmented objects at is improves the user's orientation.

In one embodiment on the basis of the image data and the labelling data an artificial neural network is trained to recognize the objects in the image data. In other words, the image data and the labelling data are used in combination as training data for the training process. This training process has been already described in the introduction of this specification. The image data and the labelling data together constitute training data for the training process, e.g., a deep learning process for the artificial neural network.

For performing the inventive method, the invention provides a processing device that may perform the described steps. The processing device comprises at least one processor and a data storage medium coupled to the at least one processor. The data storage medium stores computer readable instructions that cause the at least one processor to perform a method according to the invention if executed by the at least one processor. The processing device may be designed as a (stationary) computer station or as an electronic control unit for a vehicle.

In connection with providing the processing device as a part of a vehicle, the invention also comprises an autonomously driving vehicle, i.e., a vehicle with an autopilot device or an autopilot functionality. The inventive vehicle comprises an embodiment of the processing device. The vehicle may be designed as a passenger vehicle or a truck or a bus.

In order to enable a processing device for performing the inventive method, the invention also comprises a non-volatile computer readable data storage medium wherein the data storage medium stores computer readable instructions that cause at least one processor to perform a method according to the invention, if executed by the at least one processor. Such a data storage medium may be provided as, e.g., a hard disk or a flash drive or a compact disc, just to name a few examples.

The invention also comprises the combinations of the features of the different embodiments.

In the following figures, an exemplary implementation of the invention is described.

The embodiment explained in the following is a preferred embodiment of the invention. However, in the embodiment, the described components of the embodiment each represent individual features of the invention which are to be considered independently of each other and which each develop the invention also independently of each other and thereby are also to be regarded as a component of the invention in individual manner or in another than the shown combination. Furthermore, the described embodiment can also be supplemented by further features of the invention already described.

In the figures identical reference signs indicate elements that provide the same function.

Figure 1:
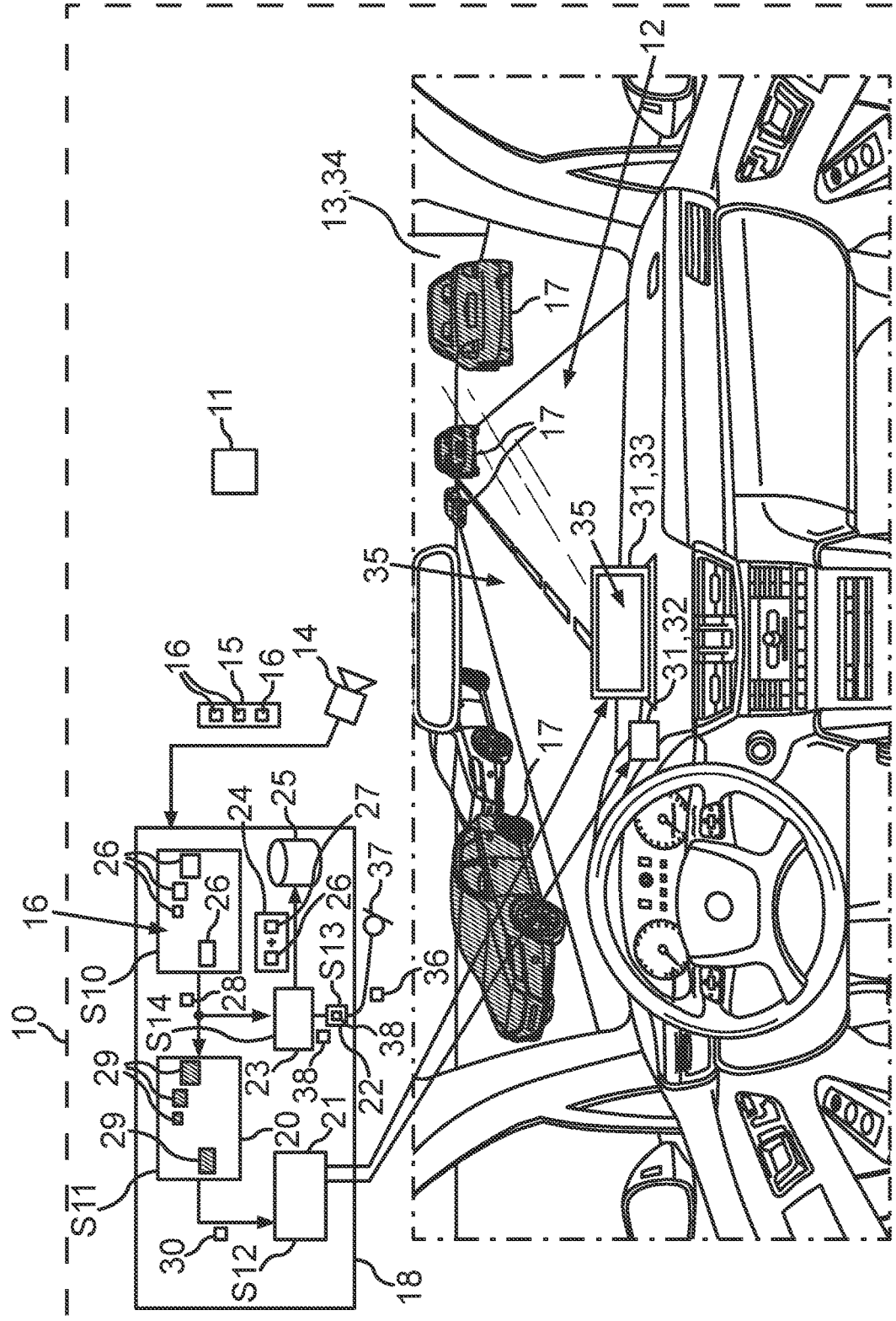
FIG. 1 is a schematic illustration of an embodiment of the inventive vehicle performing an embodiment of the inventive method.

FIG. 1 shows the vehicle 10 that can be an anonymously driving vehicle with an autopilot functionality or autopilot device 11. The vehicle 10 may be driving through a road network such that a user of the vehicle (not shown) may be watching at least one traffic situation or scene 12 through a windscreen 13, for example.

While vehicle 10 may be driving through the at least one scene 12, an imaging unit 14 may generate image data 15 showing images 16 of the at least one scene 12. In the images 16, at least one object 17 may be depicted or shown. The image data 15 may be received by a processing unit 18 which can be based on at least one processor and a data storage medium coupled to the at least one processor. For example, one or several microprocessors may be provided in the processing unit 18. On the basis of software code or computer-readable programming instructions, a segmentation unit 19, a graphical processing unit 20, a display control unit 21, an input reception unit 22 and a label generation unit 23 may be provided. The processing unit 18 may generate training data 24 that may be stored in a data storage 25 of the processing unit 18. The training data 24 may be suitable for training an artificial neural network such that the artificial neural network may be enabled to recognize the objects 17 in the images 16. To this end, the training data 24 may contain the image data 15 of single image regions 26 showing each a single object 17 and corresponding labelling data 27 describing the respective object shown in the corresponding image region 26. The image data of the image regions 26 may be taken from the image data 15 and may show a respective part of the images 16. The labelling data 27 describe, e.g., as a word or a sentence, which object 17 is shown in the respective image region 26. In other words, the labelling data 27 described the image content of the respective image region 26.

In order to generate the training data 24 and especially the labelling data 27, the processing unit 18 may perform the following method.

In a step S10, the data segmentation unit 19 may detect the at least one object 17 in the at least one scene 12 on the basis of the image data 15. The segmentation result may be expressed as segmentation data 28 that may be provided to the graphical processing unit 20. The segmentation data 28 may describe the image regions 26 that depict a respective detected object 17. The segmentation unit 19 may be based on a segmentation algorithm, for example an algorithm for evaluating edges in the images 16 and/or an optical flow analysis and/or an evaluation of depth values of, for example, radar data and/or lidar data. These data may also be provided in the image data 15. The segmentation unit 19 may be based on an algorithm taken from the prior art.

The segmentation data 28 may describe the shape and position of the regions 26 where in the images 16 and object 17 was detected. Possible regions 26 may be bounding boxes for the respective objects 17. The segmentation data 28 may contain the coordinates of a top-left and a right-bottom corner of the bounding box.

In a step S11, the graphical processing unit 20 may generate graphical object markers 29, one for each region 26, i.e., on for each detected object 17. Such an object marker 29 may be designed, for example, as the frame that may surround the respective object 17 and/or as a highlighting region for highlighting an object 17 in an image 16. Highlighting may be achieved on the basis of so-called alpha-blending. The markers 29 may be described by maker data 30 that may be provided to the display control unit 21.

In a step S12, the display control unit 21 may control at least one display unit 31, for example, ahead-up display 32 and/or a pixel-based graphical display 33. By means of the head-up display 32 the graphical display unit 21 may display the markers 29 on a combiner screen 34, for example the windscreen 13. The user looking at the at least one scene 12 through the windscreen 13 may therefore see the markers 29 in an overlay 35 over the real objects 17 in the respective scene 12. On the basis of display 33, both the images 16 from the image data 15 and the markers 29 from the marker data 30 may be displayed in combination to provide the overlay 35.

While at least one of the markers 29 is displayed, the input reception unit 22 may receive a user input 36 in a step S13. The user input 36 may be received, e.g., from a microphone 37. A user may speak out or verbally express the name or type of an object 17 which is currently marked by a specific marker 29. This provides the user input 36 to the user input unit 22. The user reception unit 23 may perform a speech recognition 38 for interpreting or recognizing the word or words spoken by the user in the user input 36. This provides a text-based description 39 of the marked object 17.

The recognition result many provided to the label generation unit 23 as the description 39 of the image content that is the marked object 17. The description 39 may be provided to the label generation unit 23. From the description 39, the label generation unit 23 may generate the labelling data 27 in a step S14. The labelling data 27 may be combined with the corresponding image data 15 of the region 26 that was marked by the marker 29 for which the user has provided the user input 36. This may yield the training data 24 where image data 15 for image regions 26 are combined with corresponding labelling data 27 that describe the image content or the semantic content of the respective image region 26.

Figure 2:
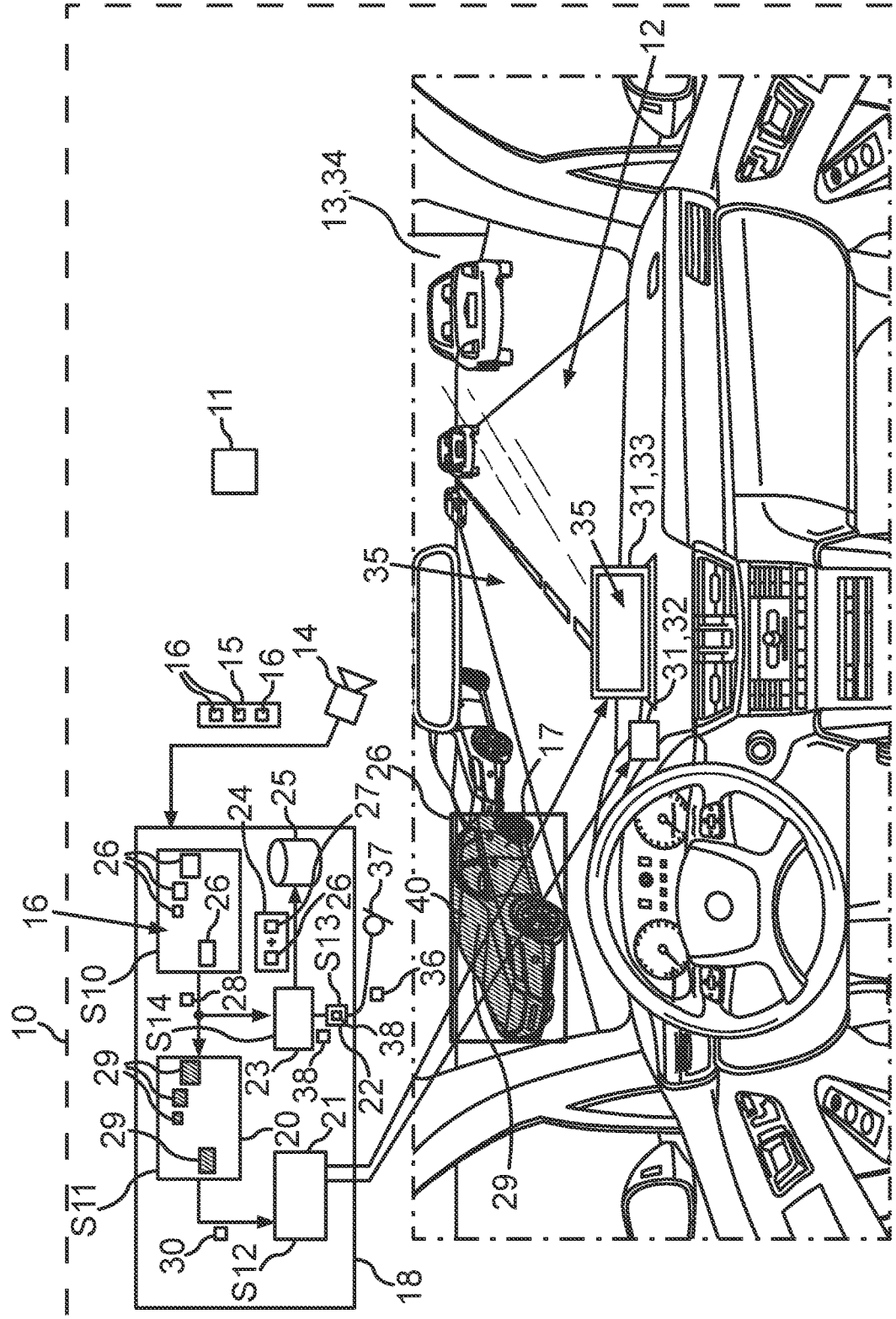
FIG. 2 is a schematic illustration of a driving situation of the vehicle where a maker is displayed.
Figure 3:
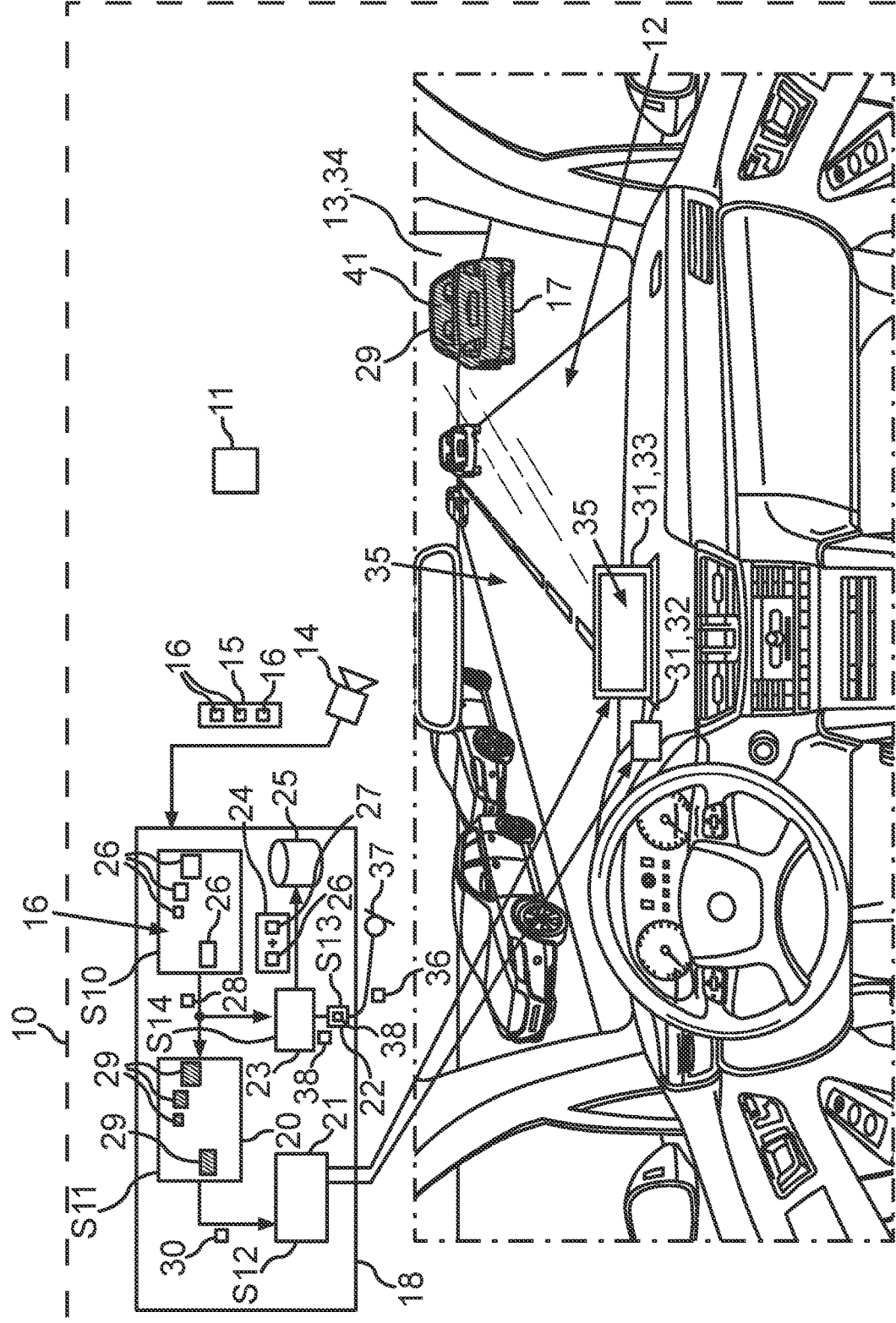
FIG. 3 is a schematic illustration of the driving situation where a second maker is displayed.

FIG. 2 and FIG. 3 illustrate, how the processing device 18 may present the markers 29 sequentially or one after the other, such that the user knows for which marker 29 the user input 36 is currently requested.

FIG. 2 illustrates how a vehicle 40 may be marked by a marker 29 as one specific detected object 17. As the user input 36, the user may provide the spoken word "vehicle" which may be recognized by the speech recognition 38 of the input reception unit 22. The recognition result is the description 39 (i.e., the text "vehicle") that may be turned into labelling data 27 by the label generation unit 23. Together with the image data 15 of the corresponding image region 26, the labelling data 27 may become a part of the training data 24 in storage 25.

After the user has provided the user input 36 for vehicle 40, the display control unit 21 may switched to the next marker 29, which is illustrated in FIG. 3. In FIG. 3, a van 41 may be marked by its marker 29 as a detected object 17. The user may then provide the spoken words "delivery van" or the spoken word "van" as a user input that may then be treated in the same way as explained in connection with FIG. 2. This results in additional training data 24.

This can be performed for several objects 17 such that the database of training data 24 may grow in storage 25. Later on, on the basis of the training data 24, an artificial neural network may be trained on the basis of the training data 24 for generating a neural-network-based object recognition unit or object recognizer.

This is rather a new combination of the following technologies:
Augmented reality
Voice, facial and/or gesture recognition
Offline Labeling (for the purpose of data aggregation for machine learning)
Problems occurring with the prior-art workflow are:
Several steps are needed to attach semantic information to recorded data (processed sensor data from e.g., camera, lidar, radar or ultrasonic)
Difficult to evaluate the performance of the autonomous vehicle because one cannot see the reality and the view of the vehicle at the same time.

The proposed technology may overlay interesting information and the real scene in an augmented reality so that the person looking at the scene can easily evaluate what was perceived by the vehicle and what was missed. On top this information can be directly enriched with meta-information or semantic information via voice command, gesture, and face recognition. This would generate for example labels together with the recorded data.

The recording of data and the generation of additional semantic information used to be two completely separated processes that are unified by this technology. On top the evaluation of the perceived information is simplified because the original scene and the generated information are shown at the same time in the observer's field of view. This way it is easier to understand the differences and flaws or gaps in the generated information.

FIG. 1 shows some of the objects 17 in the scene as an overlay 35 to the actual scene 12. This can be done as projection to the windshield or windscreen 13 (this could for example be done using a large-scale head-up display) or onto smart glasses (like augmented reality glasses) or another technology. As shown, it is easy to distinguish between the complete scene 12 and the perceived objects 17 marked by individual markers 29. In addition, it would be possible to show the path the autonomous vehicle planes to take or the abstracted map data containing e.g., lane information.

In FIG. 2 and FIG. 3, one can see different objects (a car and a van) highlighted. If one object 17 is highlighted the observer can add a label via voice commands, mimic, or gestures.

For FIG. 2 and FIG. 3. the workflow (using voice commands) would be the following:
The car is highlighted as in FIG. 2,
Observer says: "car",
The label "car" is stored together with the image data,
The van is highlighted as in FIG. 3,
Observer says "van",
The label "van" is stored together with the data.
If another method is used to add semantic information instead of saying "car" or "van" a specific mimics or gestures can be used.

This technology will work on different control units and use different projection techniques to achieve the results presented above.

The method can be used inside of a moving vehicle. It can be applied for every situation in which an overlay 35 the actual visible scene with additional augmented information is wanted and interaction with this information via verbal commands, mimic or gestures is possible. A possible application would be assigning semantic information such as labels (e.g., the labels "tree", "car", "traffic light") to objects 17 in scenes 12 perceived around an autonomous vehicle 10 while the vehicle 10 is driving.

Overall, the example shows how the generation of labeling data may be supported by a processing unit.

What is claimed is:

1. A method for generating labeling data that describe an image content of images depicting at least one scene, wherein in a processing device:
    image data describing the images are received from an imaging unit;
    a segmentation unit detects at least one object in the at least one scene on the basis of the image data and generates segmentation data describing a respective image region that depicts the respective detected object in the images;
    a graphical processing unit generates marker data that describe a respective graphical object marker that marks the respective image region of the at least one detected object on the basis of the segmentation data;
    a display control unit displays an overlay of the at least one scene and the at least one object marker on the basis of the marker data, wherein each object marker is respectively positioned over the respective object that it marks and wherein the overlay is displayed by controlling at least one display unit;
    an input reception unit receives a respective user input for each object marker, wherein the respective user input provides a description of the image content of the image region marked by the object marker; and
    a label generation unit generates the labeling data, wherein by the labeling data the respective image region depicting a respective object is associated with the description of the object as provided by the user input.

2. The method according to claim 1, wherein at least one of the following display units is controlled:
    a head-up unit, wherein the head-up unit displays the at least one object marker on a transparent combiner screen,
    a monitor screen that displays both the image data and the marker data, and/or
    a set of augmented reality glasses.

3. The method according to claim 1, wherein the input reception unit receives the user input as a voice command and performs a speech recognition for recognizing the image content and/or wherein the input reception unit receives the user input as a typed input and/or wherein the input reception unit displays a list of possible object descriptors and received a user selection of one of the object descriptors as the user input.

4. The method according to claim 1, wherein the input reception unit receives a gesture signal from a gesture recognition device and/or a gaze direction signal from a gaze recognition device and detects a marker selection that indicates which object marker the user input refers to on the basis of the gesture signal and/or the gaze direction signal.

5. The method according to claim 1, wherein in the case of several detected objects the corresponding object markers are displayed sequentially.

6. The method according to claim 1, wherein at least one additional user input is received that provides segmentation data of a missed object that was missed by the segmentation unit.

7. The method according to claim 1, wherein the at least one object is detected during a test drive of a driving vehicle and the object marker is displayed in the vehicle and a user providing the user input is situated in the vehicle during the test drive.

8. The method according to claim 7, wherein the vehicle is an autonomously driving vehicle and the path the vehicle plans to take and/or the abstracted map data containing environment information is displayed.

9. The method according to claim 1, wherein on the basis of the image data and the labeling data an artificial neural network is trained to recognize the objects in the image data.

10. A processing device comprising:
    at least one processor; and
    a data storage medium coupled to the at least one processor,
    wherein the data storage medium stores computer readable instructions that cause the at least one processor to perform a method according to claim 1 if executed by the at least one processor.

11. An autonomously driving vehicle comprising the processing device according to claim 10.

12. A non-transitory computer readable data storage medium, wherein the data storage medium stores computer readable instructions that cause at least one processor to perform a method according to claim 1, if executed by the at least one processor.

* * * * *